US006982717B2

(12) United States Patent
Sakagami et al.

(10) Patent No.: US 6,982,717 B2
(45) Date of Patent: Jan. 3, 2006

(54) GAME APPARATUS, STORAGE MEDIUM AND COMPUTER PROGRAM

(75) Inventors: Yozo Sakagami, Ota-ku (JP); Taku Izumizawa, Ota-ku (JP); Kiyotake Fujii, Ota-ku (JP)

(73) Assignee: Namco Ltd., Tokyo (JP)

( * ) Notice: Subject to any disclaimer, the term of this patent is extended or adjusted under 35 U.S.C. 154(b) by 106 days.

(21) Appl. No.: 10/774,401

(22) Filed: Feb. 10, 2004

(65) Prior Publication Data

US 2004/0166933 A1  Aug. 26, 2004

Related U.S. Application Data

(63) Continuation of application No. 09/842,064, filed on Apr. 26, 2001, now abandoned.

(30) Foreign Application Priority Data

May 9, 2000 (JP) ............................. 2000-136370

(51) Int. Cl.
*G06T 15/00* (2006.01)
(52) U.S. Cl. .................................................... 345/473

(58) Field of Classification Search .................. 345/473
See application file for complete search history.

(56) References Cited

FOREIGN PATENT DOCUMENTS

| EP | 1 056 050 A1 | 11/2000 |
|---|---|---|
| GB | 2 363 045 A | 5/2001 |
| WO | WO 00/25269 A1 | 5/2000 |
| WO | WO 01/55969 A1 | 8/2001 |

*Primary Examiner*—Almis R. Jankus
(74) *Attorney, Agent, or Firm*—Oliff & Berridge, PLC

(57) ABSTRACT

A game apparatus, a storage medium and a computer program, capable of easily and effectively reducing strange images caused by a restriction of a resolution or a refresh rate of a display unit of the game apparatus. The game apparatus comprises: an image generation section (250) for generating a space image of an object space, viewed from a virtual camera; a blurring section (250) for blurring an object first image of a predetermined object (10) of objects in the object space, according to a distance from a predetermined position to the predetermined object in the object space, to generate a blurred object second image; and an execution section (210) for executing a predetermined game by displaying the space image including the blurred object second image on a display section.

27 Claims, 12 Drawing Sheets

0m

10m

100m 0m        10m        100m

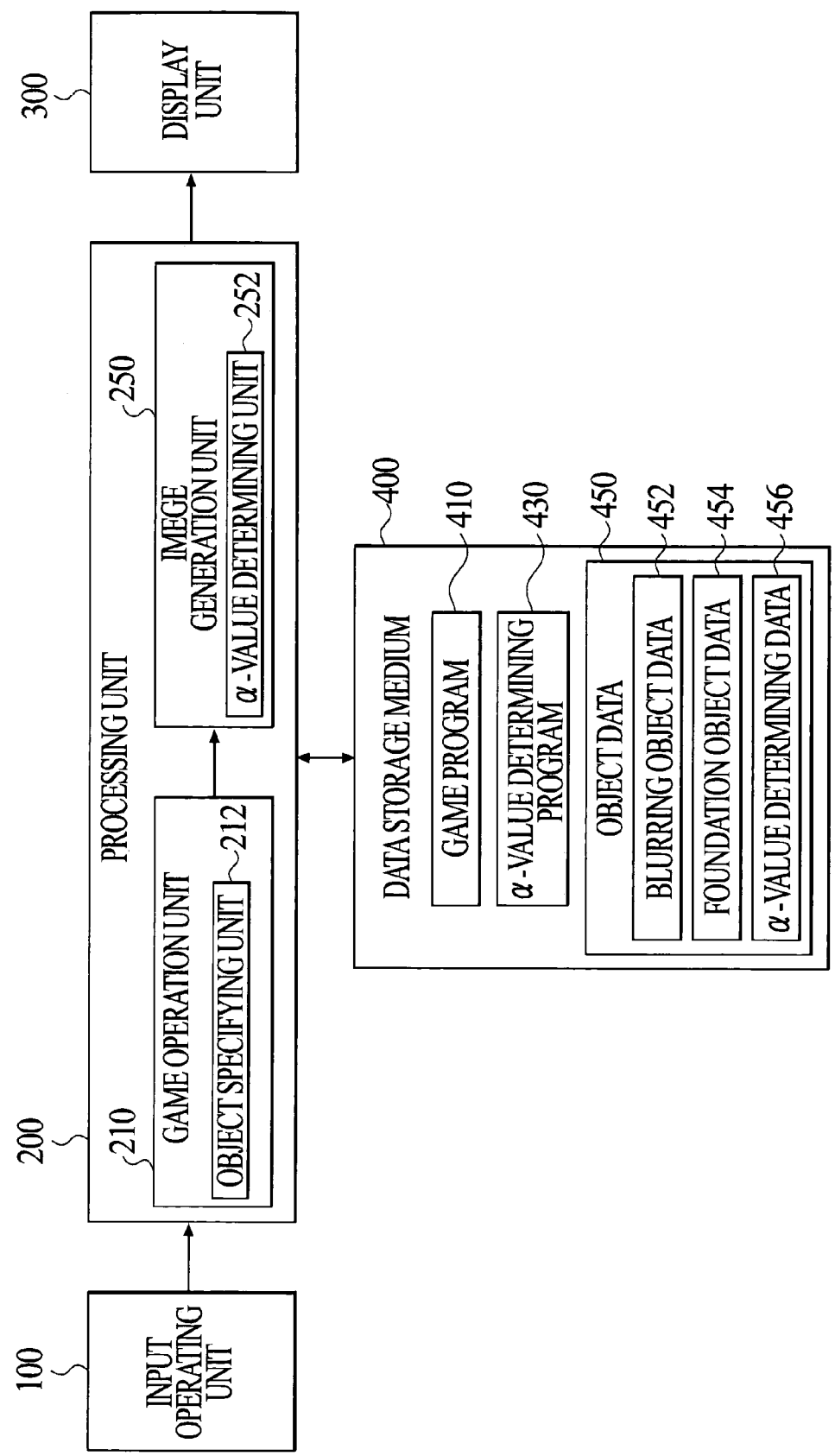

| BLURRING OBJECT | BLURRING FUNCTION |
|---|---|
| A | a |
| B | a |
| C | a |
| D | b |
| ⋮ | ⋮ |

456a

GAME APPARATUS, STORAGE MEDIUM AND COMPUTER PROGRAM

This is a Continuation of application Ser. No. 09/842,064 filed Apr. 26, 2001, now abandoned. The entire disclosure of the prior applications is hereby incorporated by reference herein in its entirety.

BACKGROUND OF THE INVENTION

1. Field of the Invention

This invention relates to a game apparatus, a storage medium and a computer program, for generating an image of an object space, viewed from a virtual camera, to execute a predetermined game by displaying the image.

2. Description of Related Art

According to a consumer game machine, a home television wherein a resolution of a video terminal is 640-by-480 dot is generally used as a display unit. Therefore, the consumer game machine generally generates sixty frames per second.

However, because the resolution of the display unit is invariable, there have occurred the following problems with a game image generated and displayed on the display unit. That is, there have occurred problems that a jaggy occurs at boundaries of objects in the object space, a moiré occurs at serial patterns, an object a size of which is equal to or less than one pixel should be displayed on the display unit or not, and so on.

Further, as described above, the number of frames (images) generated by the consumer game machine is sixty per second. Therefore, in the case the virtual camera moves in the object space, that is, practically, the virtual camera moves to follow a character operated by a player, while the consumer game machine executes a game such as a racing game, there have occurred the following problems. That is, there have occurred problems that striped patterns of stones arranged at edges of a road are displayed like they stop as the result that a moving speed of the virtual camera synchronizes with 1/60 second as an update time of the game image, they move more slowly than the practical moving speed, in the extreme case, they move in the opposite direction to the practical moving direction, or the like.

Furthermore, the above-described problems have occurred not only with the consumer game machine having the television as the display unit but also with a monitor having a high resolution and an arcade game machine.

SUMMARY OF THE INVENTION

The present invention was developed in view of the above-described problems.

It is an object of the present invention to provide a game apparatus, a storage medium and a computer program, capable of easily and effectively reducing strange images caused by a restriction of a resolution or a refresh rate of a display unit of the game apparatus.

In accordance with a first aspect of the present invention, a game apparatus comprises: an image generation section (for example, an image generation unit 250 shown in FIG. 6) for generating a space image of an object space, viewed from a virtual camera; a blurring section (for example, an image generation unit 250 shown in FIG. 6) for blurring an object first image of a predetermined object (for example, a blurring object 10 shown in FIG. 1A) of objects in the object space, according to a distance from a predetermined position to the predetermined object in the object space, to generate a blurred object second image; and an execution section (for example, a game operation unit 210 shown in FIG. 6) for executing a predetermined game by displaying the space image including the blurred object second image on a display section.

In accordance with a second aspect of the present invention, in a storage medium having a computer-executable program recorded thereon, the program comprises: a program code of generating a space image of an object space, viewed from a virtual camera; a program code (for example, an α-value determining program 430 shown in FIG. 6) of blurring an object first image of a predetermined object (for example, a blurring object 10 shown in FIG. 1A) of objects in the object space, according to a distance from a predetermined position to the predetermined object in the object space, to generate a blurred object second image; and a program code of (for example, a game program 410 shown in FIG. 6) executing a predetermined game by displaying the space image including the blurred object second image on a display section.

In accordance with a third aspect of the present invention, a computer program comprises program code means for performing the steps of: generating a space image of an object space, viewed from a virtual camera; blurring an object first image of a predetermined object of objects in the object space, according to a distance from a predetermined position to the predetermined object in the object space, to generate a blurred object second image; and executing a predetermined game by displaying the space image including the blurred object second image on a display section.

Herein, the object space means a game space of the predetermined game, and comprises the virtual camera set therein. Further, the space image means an image of the object space, displayed on the display section. Further, the object first image is an image of the predetermined object, before being blurred, for example, by the blurring section, and the blurred object second image is an image as a result of blurring the object first image of the predetermined object.

According to the game apparatus, the storage medium or the computer program of the first, second or third aspect of the present invention, the space image of the whole object space is not blurred, but the image of the predetermined object in the object space is blurred. Consequently, it is possible that the blurring processing of the image is easily carried out at a high speed. Further, the blurring processing of the image is carried out according to the distance from the predetermined position to the predetermined object. Consequently, for example, in the case the predetermined position is a location of the virtual camera, it is possible to effectively reduce strange images as a serial pattern of moiré occurred by the cause as the object image becomes finer according to the distance from the virtual camera, a transformation of the object image occurred by the cause that the width of the object displayed on the display section is narrowed, and so on.

Herein, the above-described blurring processing may be carried out to the whole image of the predetermined object uniformly, or to the image of the predetermined object image displayed on the display section every pixel.

Preferably, according to the game apparatus of the first aspect of the present invention, the predetermined object comprises an objective target (for example, a blurring object 10 shown in FIG. 1A) having at least one target surface, for expressing a target of the predetermined object, and an objective foundation (for example, a foundation object 20 shown in FIG. 1A) for expressing a foundation of the target, according to a background of the predetermined object; and the blurring section blurs an image of the objective target to bring an image of the objective foundation into appear.

Preferably, according to the storage medium having a computer-executable program recorded thereon, of the second aspect of the present invention, the program further comprises: a program code (for example, a blurring object data 452 shown in FIG. 6) of expressing a target of the predetermined object; a program code (for example, a foundation object data 454 shown in FIG. 6) of expressing a foundation of the target, according to a background of the predetermined object; a program code of expressing the predetermined object having the target and the foundation; and a program code (for example, an α-value determining data 456 shown in FIG. 6) of blurring an image of the target to bring an image of the foundation into appear.

Preferably, the computer program of the third aspect of the present invention, further comprises program code means for performing the steps of: expressing a target of the predetermined object; expressing a foundation of the target, according to a background of the predetermined object; expressing the predetermined object having the target and the foundation; and blurring an image of the target to bring an image of the foundation into appear.

Herein, the target is definitely expressed as one part of the object space in the case the predetermined object is near the predetermined position. The foundation is expressed so as to have the same form as the form of the target, and so as to be at one with the background of the predetermined object in the case the predetermined object is the farthest from the predetermined position.

Further, in the case the target is expressed by a plurality of target surfaces, the image of the target may be blurred every target surface, or at one with the whole target surfaces.

According to the game apparatus, the storage medium or the computer program as described above, for example, the foundation of the target has patterns of color saturation like color saturation of the target is toned down, and like the background of the predetermined object. Consequently, if the image of the target is blurred, it is possible that the game image is harmonized on the whole according to the predetermined game.

Preferably, according to the game apparatus of the first aspect of the present invention, the predetermined object the object first image of which is blurred by the blurring section is determined from the objects in the object space, according to a progress of the predetermined game executed by the execution section (for example, an object specifying unit 212 shown in FIG. 6).

Preferably, according to the storage medium having a computer-executable program recorded thereon, of the second aspect of the present invention, the program further comprises: a program code of determining the predetermined object the object first image of which is blurred from the objects in the object space, according to a progress of the predetermined game.

Preferably, the computer program of the third aspect of the present invention, further comprises program code means for performing the step of: determining the predetermined object the object first image of which is blurred from the objects in the object space, according to a progress of the predetermined game.

Herein, the progress of the predetermined game includes, for example, a moving speed of a character operated by a player, a moving speed of the virtual camera to follow the character, a weather of a racing course and so on, in the case the predetermined game is a racing game.

According to the game apparatus, the storage medium or the computer program as described above, it is possible that the image of the predetermined object is blurred as the occasion may demand.

Preferably, according to the game apparatus of the first aspect of the present invention, the predetermined position is a location of the virtual camera.

Preferably, according to the game apparatus as described above, the blurring section blurs the object first image of the predetermined object, according to a sight line angle of the virtual camera to the predetermined object.

Preferably, according to the storage medium having a computer-executable program recorded thereon, of the second aspect of the present invention, the program further comprises: a program code of setting a location of the virtual camera, as the predetermined position.

Preferably, according to the storage medium having a computer-executable program recorded thereon, as described above, the program further comprises: a program code of blurring the object first image of the predetermined object, according to a sight line angle of the virtual camera to the predetermined object.

Preferably, the computer program of the third aspect of the present invention, further comprises program code means for performing the step of: setting a location of the virtual camera, as the predetermined position.

Preferably, the computer program as described above, further comprises program code means for performing the step of: blurring the object first image of the predetermined object, according to a sight line angle of the virtual camera to the predetermined object.

According to the game apparatus, the storage medium or the computer program as described above, the image of the predetermined object can be blued according to the sight line angle of the virtual camera to the predetermined object. Consequently, for example, in the case the predetermined object having a serious pattern is viewed from an oblique upper air, it is possible that a jaggy, a moiré and so on are reduced effectively.

Preferably, the game apparatus of the first aspect of the present invention, further comprises: a setting section for setting a fixation point as the predetermined position, according to a progress of the predetermined game executed by the execution section.

Preferably, according to the storage medium having a computer-executable program recorded thereon, of the second aspect of the present invention, the program further comprises: a program code of setting a fixation point as the predetermined position, according to a progress of the predetermined game.

Preferably, the computer program of the third aspect of the present invention, further comprises program code means for performing the step of: setting a fixation point as the predetermined position, according to a progress of the predetermined game.

According to the game apparatus, the storage medium or computer program as described above, the present invention can be applied to the predetermined game, as one of the depth of field processing. Consequently, it is possible that a player's attention is attracted to the fixation point in the object space.

Preferably, according to the game apparatus of the first aspect of the present invention, the predetermined game is a racing game, and the blurring section blurs an object image on a racing course of the racing game.

Preferably, according to the storage medium having a computer-executable program recorded thereon, of the second aspect of the present invention, the program further comprises: a program code of blurring an object image of a racing course on a racing game as the predetermined game.

Preferably, the computer program of the third aspect of the present invention, further comprises program code means for performing the steps of: blurring an object image of a racing course on a racing game as the predetermined game.

Herein, the object on the racing course of the racing game is a necessary object to set the racing course, such as white lines, edge stones, a billboard, wire netting, a guardrail and so on.

According to the game apparatus, the storage medium or the computer program as described above, the present invention can be applied to the racing game wherein strange images caused by a restriction of a resolution or a refresh rate of the display section are frequently occurred because the virtual camera is moved at various speeds. Consequently, it is possible to provide an effect of the present invention on the racing game, remarkably.

Preferably, according to the game apparatus of the first aspect of the present invention, the blurring section blurs an object image of an object processed by an anti-aliasing, a mip mapping or a level of detail processing (LOD), of the objects in the object space.

Preferably, according to the game apparatus of the first aspect of the present invention, the blurring section carries out an image composition processing to the predetermined object as a transparency of the predetermined object is changed.

Preferably, according to the storage medium having a computer-executable program recorded thereon, of the second aspect of the present invention, the program further comprises: a program code of blurring an object image of an object processed by an anti-aliasing, a mip mapping or a level of detail processing (LOD), of the objects in the object space.

Preferably, according to the storage medium having a computer-executable program recorded thereon, of the second aspect of the present invention, the program further comprises: a program code of carrying out an image composition processing to the predetermined object as a transparency of the predetermined object is changed.

Preferably, the computer program of the third aspect of the present invention, further comprises program code means for performing the step of: blurring an object image of an object processed by an anti-aliasing, a mip mapping or a level of detail processing (LOD), of the objects in the object space.

Preferably, the computer program of the third aspect of the present invention, further comprises program code means for performing the step of: carrying out an image composition processing to the predetermined object as a transparency of the predetermined object is changed.

Herein, the image composition carried out as the transparency of the predetermined object is changed is not limited to α-Algorithm or α-Blending.

Preferably, according to the game apparatus of the first aspect of the present invention, the predetermined object comprises a first object for expressing a foundation and a second object for expressing a surface layer having at least one surface on the first object; and the blurring section blurs the second object to bring the first object into appear.

Preferably, according to the storage medium having a computer-executable program recorded thereon, of the second aspect of the present invention, the program further comprises: a program code of expressing a foundation of the predetermined object; a program code of expressing a surface layer having at least one surface on the foundation, of the predetermined object; a program code of expressing the predetermined object having the foundation and the surface layer; and a program code blurring the surface layer to bring the foundation into appear.

Preferably, the computer program of the third aspect of the present invention, further comprises program code means for performing the steps of: expressing a foundation of the predetermined object; expressing a surface layer having at least one surface on the foundation, of the predetermined object; expressing the predetermined object having the foundation and the surface layer; and blurring the surface layer to bring the foundation into appear.

BRIEF DESCRIPTION OF THE DRAWINGS

The present invention will become more fully understood from the detailed description given hereinafter and the accompanying drawings which are given by way of illustration only, and thus are not, intended as a definition of the limits of the present invention, and wherein:

FIG. 6 is a functional block diagram of the game apparatus according to the embodiment of the present invention;

PREFERRED EMBODIMENT OF THE INVENTION

Hereinafter, a preferred embodiment of the game apparatus of the present invention will be explained with reference to figures, as follows.

Although the case the game apparatus of the present invention executes a motorcycle racing game will be explained as an example, the present invention is not limited to the case.

First, the principal of the present invention will be explained, as follows.

Figure 1A:
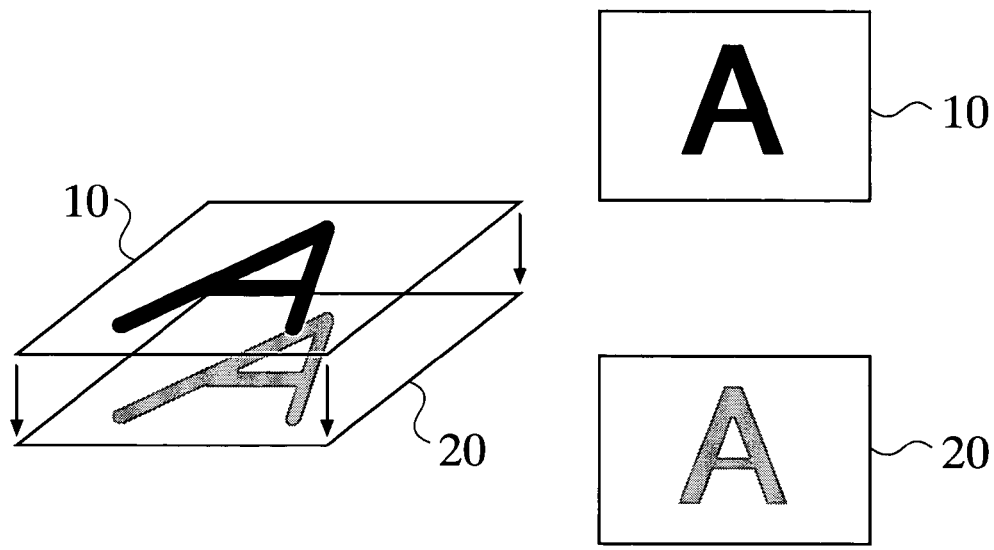
FIGS. 1A and 1B are views for explaining a principal of the present invention.

As shown in FIG. 1A, according to the game apparatus of the present invention, a blurring object 10 is superimposed on a foundation object 20, to compose one predetermined object. Then, the predetermined object is arranged in an object space, that is, a game space of a predetermined game executed by the game apparatus. Thereafter, the image of the blurring object 10 of the predetermined object is blurred according to the distance from a virtual camera set in the object space, to the predetermined object.

Hereinafter, the blurring object means a target definitely expressed as one part of the object space in the case the predetermined object is near the virtual camera, and the foundation object means one forming the same shape as the blurring object and assimilated to a background of the predetermined object in the case the predetermined object is away from the virtual camera.

Figure 1B:
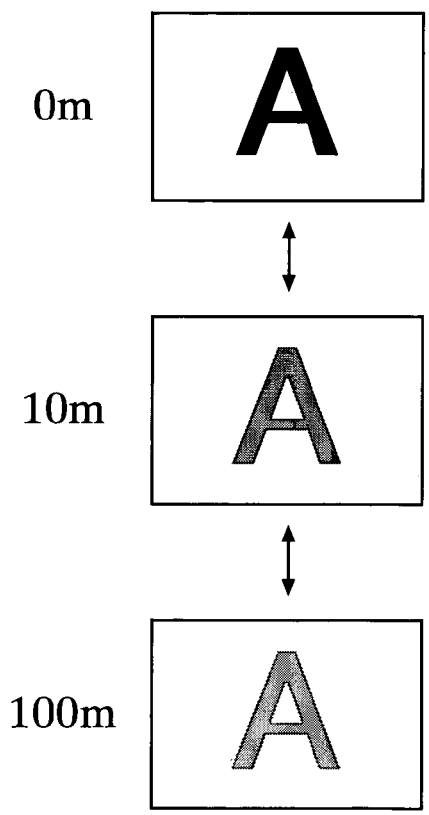

That is, as shown in FIG. 1B, the farther from the virtual camera the predetermined object is, the more the image of the blurring object 10 goes out of sight and the more the image of the foundation object 20 comes into sight. In other words, in the case the predetermined object is far away from the virtual camera, only the image of the foundation object 20 can be seen. Further, the nearer to the virtual camera the predetermined object is, the more the image of the blurring object 10 comes into sight.

Thereinafter, according to the predetermined object comprising the blurring object 10 and the foundation object 20, an image of an object generated by blurring the image of the blurring object 10 will be referenced to as a composition image.

The method of blurring the image of the blurring object 10 is based on a pixel value determining algorithm using the following equation (1) using an α (alpha) value.

$$C = \alpha S + (1-\alpha) \times D \qquad (1)$$

Herein, the reference character C denotes color data of the composition object composed of the blurring object 10 and the foundation object 20, the reference character S denotes color data of the blurring object 10, the reference character D denotes color data of the foundation object 20, and the reference character α denotes the opacity. The α varies from 0 to 1.

According to the pixel value determining algorithm, the above-described equation (1) is applied to the RGB (Red, Green, Blue) values of each pixel of the image of the blurring object 10 and the RGB values of each pixel of the image of the foundation object 20. Thereby, the RGB values of the image of the composition object are determined, so that the composition image is determined.

Further, the value of α which is referenced to as the α value through the specification, is determined by a function relating the distance from the virtual camera to the predetermined object to the one α value. The above-described function is references to as a blurring function.

Figure 2A:
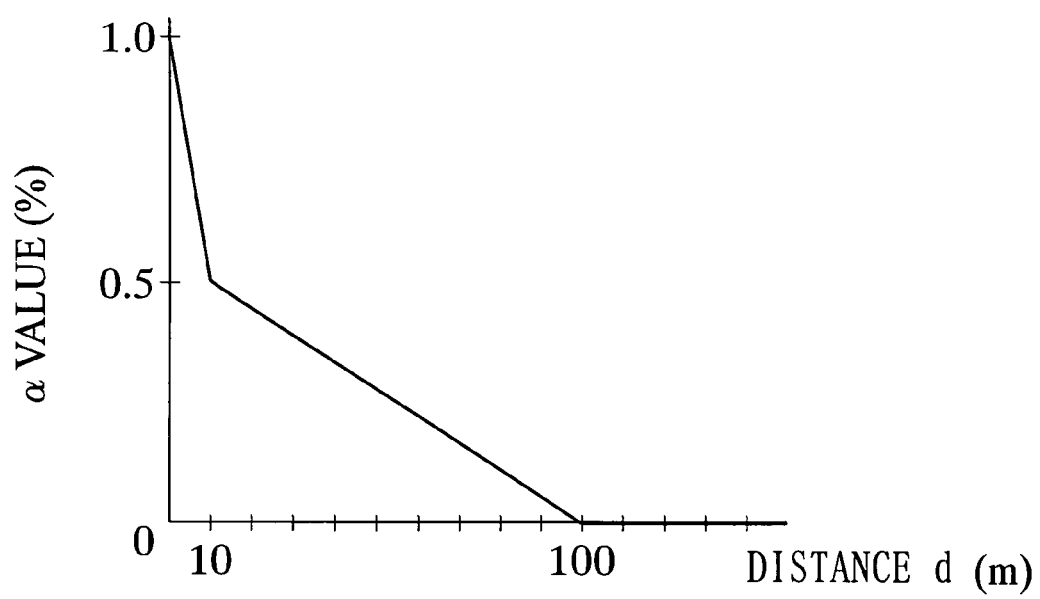
FIG. 2A is a graph showing an example of a blurring function.

FIG. 2A shows an example of the blurring function. According to the blurring function as shown in FIG. 2A, the α value varies linearly from "1.0" to "0.5" while the distance (d) from the virtual camera to the predetermined object varies from 0 m to 10 m in the object space, and the α value varies linearly from "0.5" to "0.0" while the distance (d) varies from 10 m to 100 m. That is, as shown in FIG. 2A, the opacity decreases sharply while the distance (d) from the virtual camera to the predetermined object increases from 0 m to 10 m, the opacity decrease slowly while the distance (d) increases from 10 m to 100 m, and the image of the blurring object 10 becomes transparent while the distance (d) increases from 100 m and more.

Figure 2B:
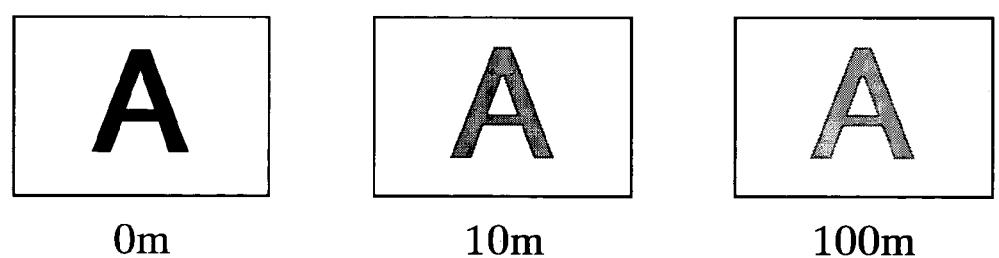
FIG. 2B is a view showing examples of composition images expressed according to the blurring function of FIG. 2A.

FIG. 2B shows examples of the composition images each of which is composed of the blurring object 10 and the foundation object 20, according to the blurring function shown in FIG. 2A, on the basis of the distance (d).

As shown in FIG. 2B, in the case the distance (d) from the virtual camera to the predetermined object is 0 m, the composition image is composed only of the image of the blurring object 10. In the case the distance (d) is 10 m, the composition image is composed of the image of the blurring object 10 and the image of the foundation object 20. In the case the distance (d) is 100 m, the composition image is composed only of the image of the foundation image 20.

The blurring processing is carried out to the image of the predetermined object every pixel thereof, when the rendering is carried out to the image of the predetermined object.

That is, according to the blurring processing, the distance from the virtual camera to the predetermined object is determined every vertex of the polygons composing the blurring object of the predetermined object, and thereby, the α value is determined on the basis of the distance with reference to the blurring function as shown in FIG. 2A. Thereafter, the α value is substituted for the above-described equation (1), and thereby, the color of the composition image to be displayed on the display screen is determined every pixel of the composition image. Therefore, according to one predetermined object, the color of the part near to the virtual camera is displayed so as to be different from the color of the part far from the virtual camera.

Figure 2C:
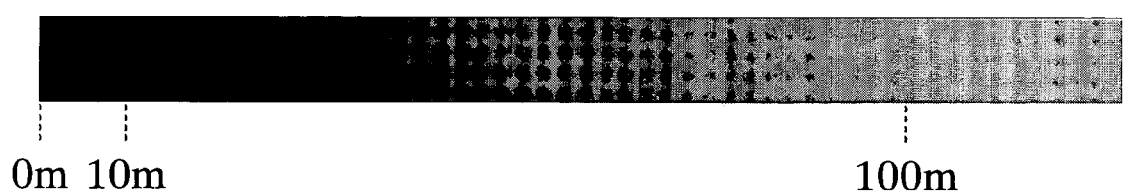
FIG. 2C is a view showing a color sample of the composition image.

FIG. 2C shows a color sample in the case the color data of the blurring object 10 are composed with the color data of the foundation object 20 according to the blurring function shown in FIG. 2A.

As shown in FIG. 2C, the greater the distance (d) from the virtual camera to the predetermined object is, the nearer to the color of the foundation object 20 the color of the composition image is.

Figure 3:
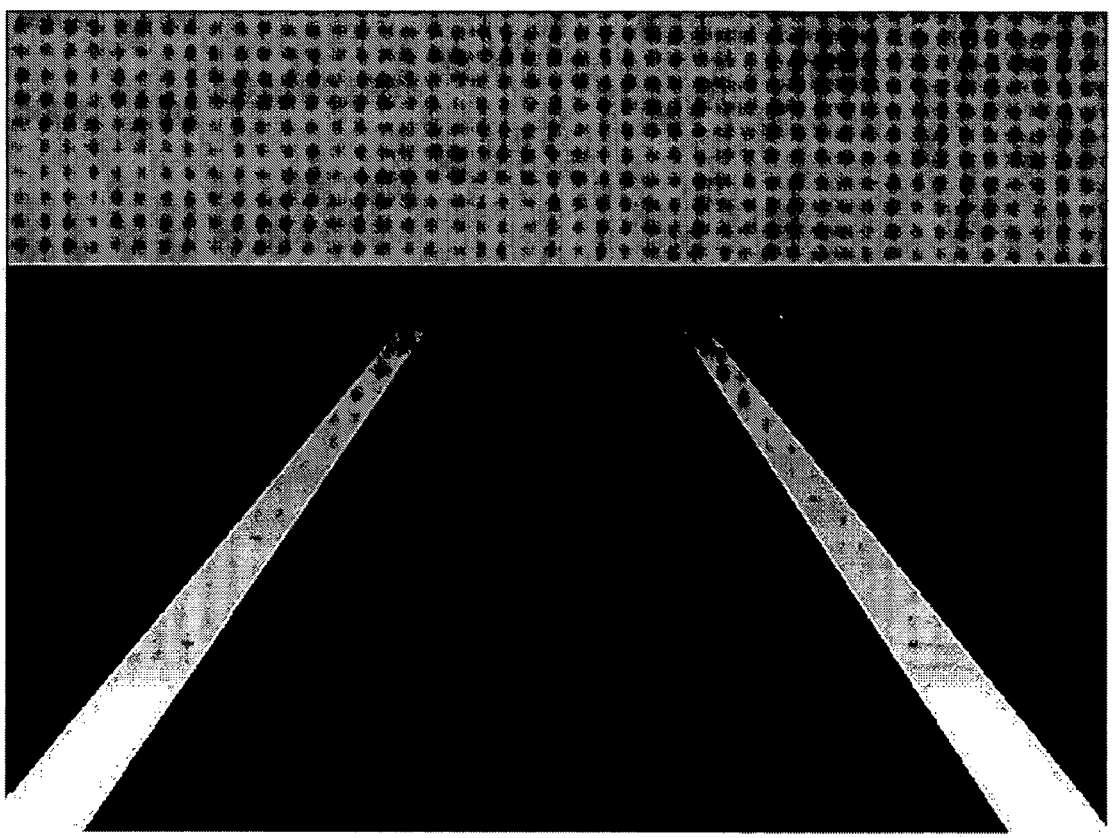
FIG. 3 is a view showing an exemplary screen wherein a game apparatus of the present invention performs a blurring processing to a white line object of a racing course.

FIG. 3 is an exemplary screen wherein the game apparatus of the present invention performs the blurring processing to a white line object of a racing course.

In FIG. 3, the white line object consists of: two white lines as the blurring object thereof; and an object forming the same shape as the white lines and assimilative to a road surface of the racing course as the foundation object thereof.

As shown in FIG. 3, the white lines are more blurred, as the white lines goes away from this side of the screen that is the virtual camera location. Further, when the white lines are far away from the virtual camera location by more than a predetermined distance, one part of each white line is not displayed on the screen, but only the road surface of the racing course as the foundation object of the part is displayed on the screen.

Figure 4A:
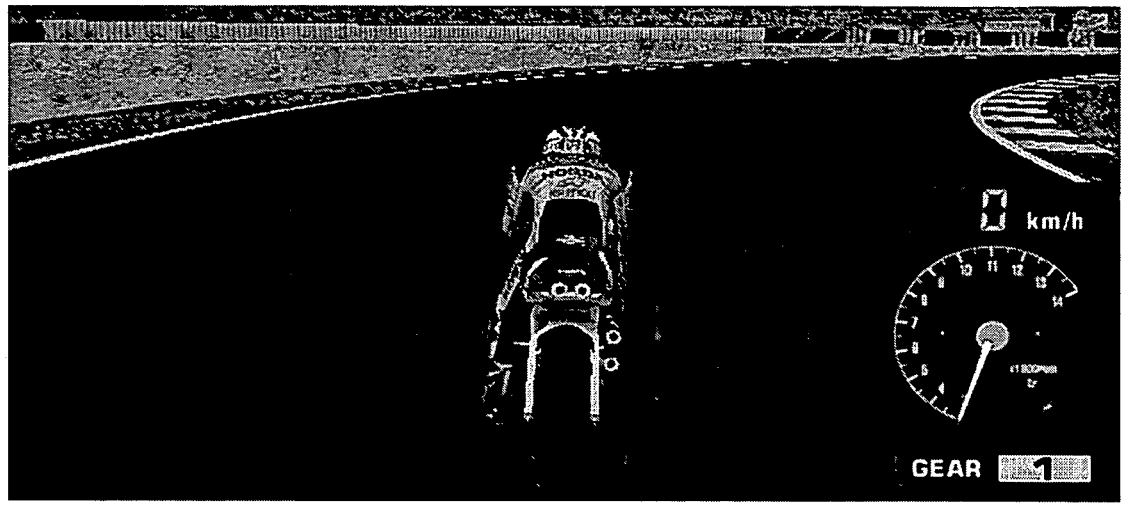
FIGS. 4A and 4B are views showing exemplary practical screens of a game before and after the game apparatus performs the blurring processing to the white line object, respectively.
Figure 4B:
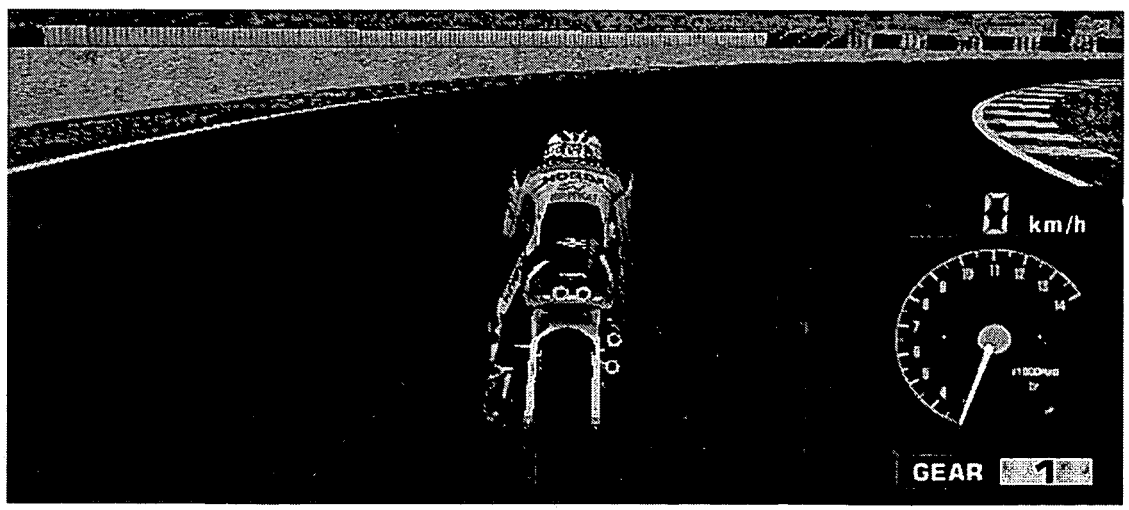

FIGS. 4A and 4B are exemplary practical screens of the game before and after the game apparatus of the present invention performs the blurring processing to the white line object, respectively.

In FIG. 4B, the white line object consists of: a white line as the blurring object thereof; and an object forming the same shape as the white line and assimilative to the road surface on the racing course of streamlined patterns as the foundation object thereof.

As shown in FIG. 4A, the width of the white line displayed on the display screen is narrower, as the white lines goes away from this side of the screen that is the virtual camera location. Further, because the racing course curves, one part of the white line occurs, wherein the width of the part exceeds one pixel or not. Therefore, because the part of the white line far away from the virtual camera location is expressed as the broken line as shown in FIG. 4A, the unnatural game image is generated on the display screen. Further, because the part having been expressed as the broken line becomes expressed as the solid line as the part becomes nearer to the virtual camera, the player concentrates eyes thereof on the white line to which the player does not pay attention usually. As a result, the player more feels that the game image is strange.

However, as shown in FIG. 4B, the game apparatus carries out the blurring processing to the white line object, and thereby, the broken line expressing the part of the white line far away from the virtual camera location is not to be displayed on the display screen. Therefore, a part of the white line does not expressed on the display screen. However, because the player does not usually pay attention to the part of the white line far away from the virtual camera location, it is possible that the natural game image is generated. Further, because the foundation object of the white line object provides streamlined patterns expressing a high speed, of the road surface of the racing course, it is possible that the part at which the white line is not expressed is harmonious with the background of the part.

Figure 5A:
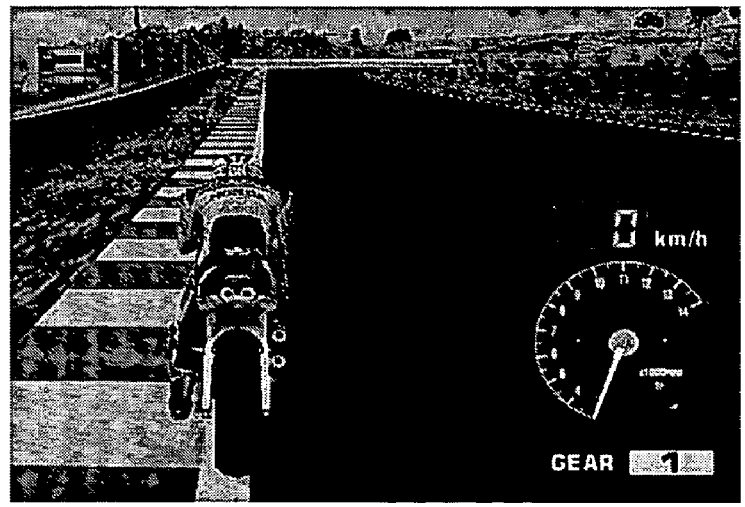
FIGS. 5A and 5B are views showing exemplary practical screens of the game before and after the game apparatus performs the blurring processing to an edge stone object at which striped patterns are provided, respectively.
Figure 5B:
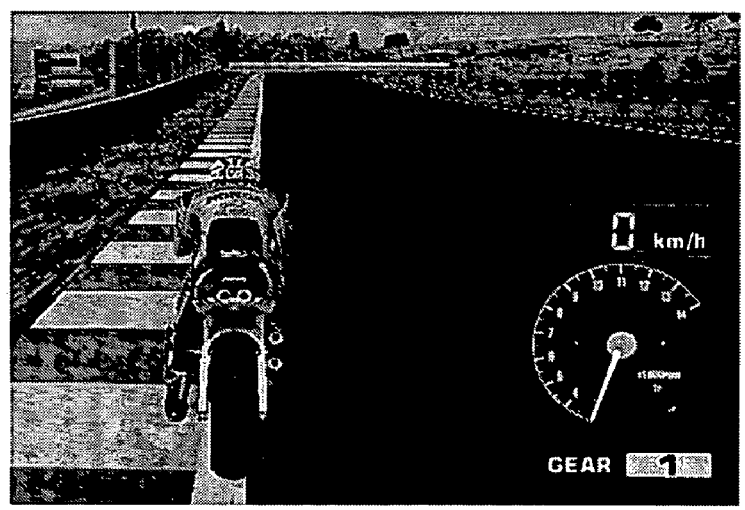

FIG. 5A and 5B are exemplary practical screens of the game before and after the game apparatus of the present invention performs the blurring processing to the edge stone object at which striped patterns are provided, respectively.

In FIG. 5B, the edge stone object consists of: an edge stone as the blurring object thereof; and an object forming the same shape as the edge stone and patterned like the color saturation of the edge stone is toned down as the foundation object thereof.

As shown in FIG. 5A, on the screen before the game apparatus carries out the blurring processing to the edge stone object, the moiré occurs at the striped patterns of the edge stone, so that the striped patterns of the edge stone away from this side of the screen, that is the virtual camera location are transformed to be displayed. The above-described phenomenon occurs more remarkably on the game screen wherein the virtual camera moves. That is, although the striped patterns are only provided at the edge practically, the striped patterns are displayed like they move and vary by the moiré. Therefore, the edge stone is expressed like another one.

However, as shown in FIG. 5B, the game apparatus of the present invention carries out the blurring processing to the edge stone object, and thereby the color saturation of the striped patterns of the edge stone decreases gradually. Therefore, it is possible that the natural game image in which the moiré is not generated is generated as shown in FIG. 5B.

As described above, the blurring processing carried out by the game apparatus of the present invention is executed not to the whole screen but to the specific object of the screen. Accordingly, because the amount of operation is small, it is possible that the blurring processing is carried out at a high speed.

That is, if the blurring processing is applied to all object displayed on the screen as the view of the virtual camera, that is the view volume, the amount of operation increases excessively, and the object necessary to be displayed on the screen, for example, a character object may not been displayed on the screen. Therefore, it is important that the game apparatus carries out the blurring processing to which object of all objects in the view volume, and which object of all objects is effective in being processed by the blurring processing in the game.

FIG. 6 is a functional block diagram of the game apparatus according to the embodiment of the present invention. As shown in FIG. 6, the game apparatus comprises an input operating unit 100, a processing unit 200, a display unit 300, and a data storage medium 400.

The input operating unit 100 is used for the player to input an operation data. The input operating unit 100 has a function realized by hardware having a lever, buttons, a covering body or the like. When either one of the buttons or the like is pushed down, the input operating unit 100 outputs an operation signal to the processing unit 200.

The processing unit 200 carries out a processing of positioning objects and the virtual camera in the object space, a processing of generating images viewed from the virtual camera, and so on, on the basis of the above-described operation signal, a game program 410 stored in the data storage medium 400, for executing the motorcycle racing game, and so on. The processing unit 200 has a function realized by hardware such as a CPU, for example, a CISC type of CPU or a RISC type of CPU, a DSP, an ASIC, for example, a gate array or the like, a memory or the like.

The processing unit 200 comprises a game operation unit 210 and an image generation unit 250.

The game operation unit 210 carries out a processing of progressing the game, a processing of determining the location and the direction of the virtual camera, a processing of positioning the predetermined object including the blurring object and the foundation object in the object space, the processing of clipping to determine the view volume, and so on. Further, the game operation unit 210 comprises an object specifying unit 212 for specifying the predetermined object of objects in the view volume.

The object specifying unit 212 may specify the predetermined object to which the blurring processing is carried out, according to the progress of the game.

That is, for example, according to the racing game, the object specifying unit 212 may not always specify the white line object as the predetermined object. For example, the object specifying unit 212 may specify the white line object as the predetermined object only in the case the white line is going to curve, in the case the race is performed in fine weather, or the like.

The image generation unit 250 carries out a processing of generating the image of the object space set by the game operation unit 210, on the basis of the virtual camera in the object space located and set by the game operation unit 210. More specifically, the image generation unit 250 carries out the perspective projection transformation to the object space in the view volume, the hidden surfaces processing using a Z buffer, and the processing of imaging polygons composing the object every pixel in a frame buffer not shown in figures. Further, the image generation unit 250 comprises an α-value determining unit 252.

Further, the image generation unit 250 determines the color of the polygons on the basis of an object data 450 and so on. The color of the composition image composed of the blurring object and the foundation object is determined on the basis of the following method.

The α-value determining unit 252 of the image generation unit 250 determines the α value of each polygon on the basis of the distance from the virtual camera to each vertex of the polygon composing the predetermined object specified by the object specifying unit 212. The distance from virtual camera to each vertex of the polygon is called the depth information.

Thereafter, the image generation unit 250 determines the color of the composition image every pixel on the basis of the equation (1) for which the α value determined by the α-value determining unit 252 is substituted.

When the image generation unit 250 images one frame of image on the frame buffer, the image is displayed on the display unit 300.

The data storage medium 400 stores not only the game program 410 on the motorcycle racing game, but also the α-value determining program 430 of determining the α value of the blurring processing, read out and executed by the α-value determining unit 252, the object data 450 including the blurring object and the foundation object, and data such as default values of the game and so on.

The object data 450 stores not only a blurring object data 452 that is the blurring object data of the predetermined object, a foundation object data 454 that is the foundation object data of the predetermined object, data including the arrangement position, the color data and so on, of each of polygons composing the model of each object including the blurring object and the foundation object, but also an α-value determining data 456.

Figures 7, 8:
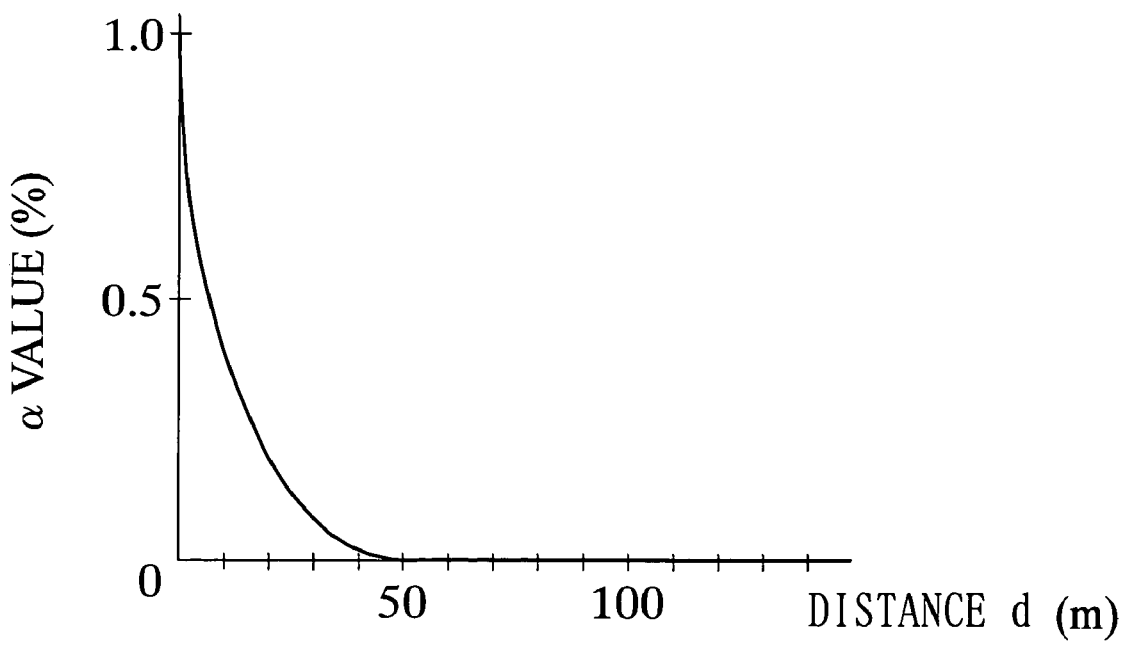
FIG. 7 is a diagram showing an example of a data table 456a relating between each blurring object and each blurring function, of an α-value determining data 456.
FIG. 8 is a graph showing another example of the blurring function.

The α-value determining data 456 includes a data table 456a as shown in FIG. 7 and the blurring function as shown in FIG. 2A or 8.

FIG. 7 is a diagram showing an example of the data table 456a.

As shown in FIG. 7, the blurring objects "A", "B" and "C" are related to the blurring function "a", and the blurring object "D" is related to the blurring function "b". Therefore, the blurring function can be set every blurring object, individually.

FIG. 8 shows another example of the blurring function. The blurring function shown in FIG. 8 is an exponential function.

Accordingly, for example, because each blurring object can be related to the blurring function as shown in FIG. 2A or 8, individually, the blurring limit can be set every blurring object.

The data storage medium 400 has a function realized by hardware such as a CD-ROM, a game cassette, an IC card, a MO, a FD, a DVD, a hard disk, a memory or the like. The processing unit 200 reads the data and the programs out of the data storage medium 400, to execute various types of processing on the basis of them.

Next, the blurring processing executed by the processing unit 200 will be explained with reference to FIG. 9.

Figure 9:
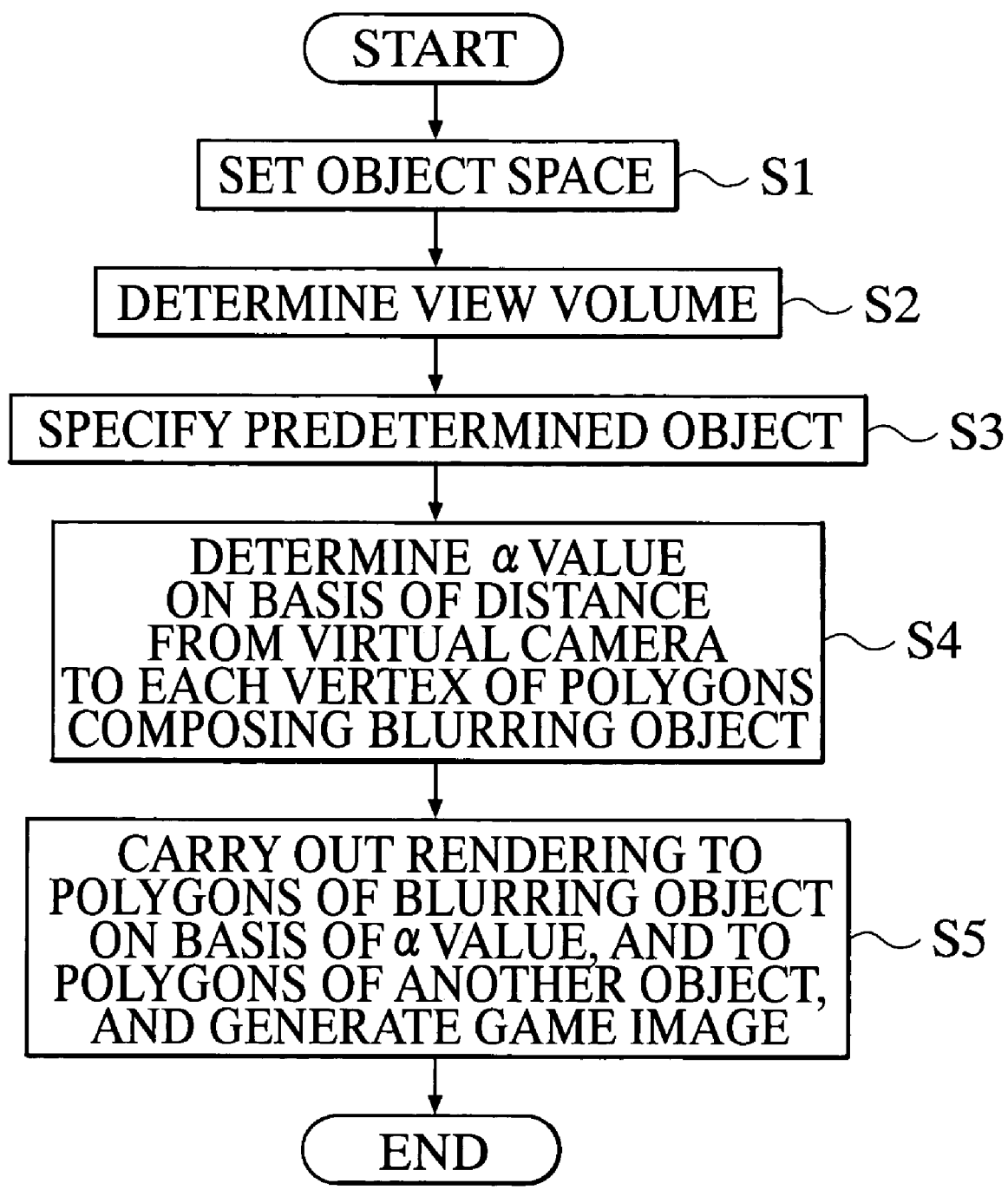
FIG. 9 is a flowchart showing the operation of a processing unit 200 for generating one frame of game image.

FIG. 9 is a flowchart showing the operation of the processing unit 200 for generating one frame of game image.

In FIG. 9, when the processing unit 200 starts the blurring processing, first, the game operation unit 210 of the processing unit 200 sets objects each of which includes the blurring object and the foundation object and the virtual camera in the object spate (Step S1). Then, the game operation unit 210 determines the view volume on the basis of the virtual camera set in the object space at the Step S1 (Step S2).

Thereafter, the object specifying unit 212 of the game operation unit 210 specifies the predetermined object of objects located in the view volume determined at the Step S2 (Step S3).

The α-value determining unit 252 of the image generation unit 250 determines the α value on the basis of the distance from the virtual camera to each vertex of polygons composing the blurring object of the predetermined object specified at the Step S3 (Step S4).

Thereafter, the image generation unit 250 of the processing unit 200 carries out the rendering to the polygons composing the blurring object on the basis of the α value determined at the Step S4, and to polygons composing another objects. Thereby, the image generation unit 250 generates one frame of game images (Step S5). Then, the processing unit 200 ends the blurring processing.

Next, an exemplary hardware configuration realizable the game apparatus according to the embodiment of the present invention will be explained with reference to FIG. 10, as follows.

Figure 10:
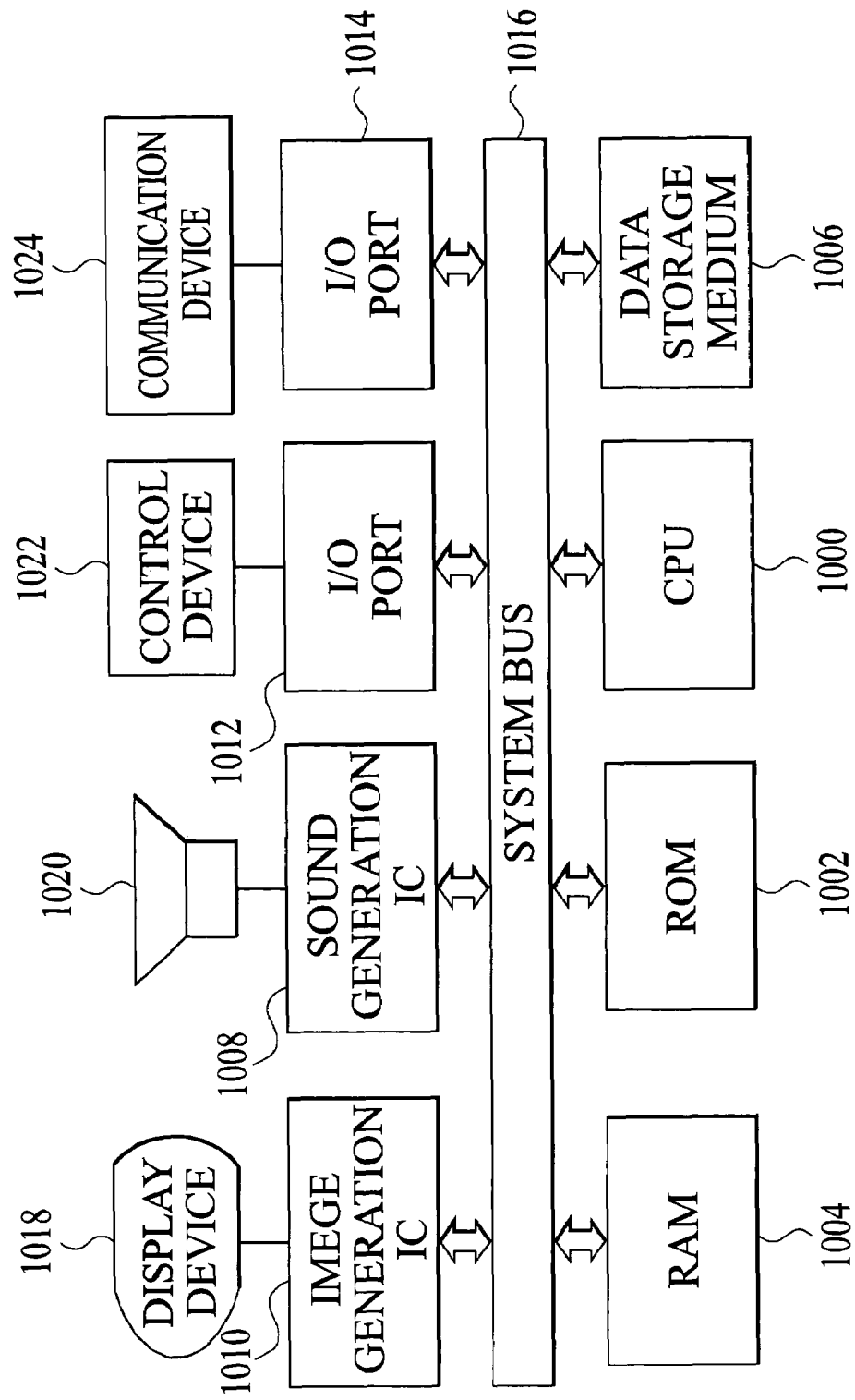
FIG. 10 is a block diagram showing an exemplary hardware configuration realizable the game apparatus according to the embodiment of the present invention.

The game apparatus as shown in FIG. 10 comprises a CPU 1000, a ROM 1002, a RAM 1004, a data storage medium 1006, a sound generation IC 1008, an image generation IC 1010, and I/O ports 1012 and 1014 that are interconnected by a system bus 1016 so that data can be exchanged therebetween. A display device 1018 is further connected to the image generation IC 1010, a speaker 1020 is further connected to the sound generation IC 1008, a control device 1022 is further connected to the I/O port 1012, and a communication device 1024 is further connected to the I/O port 1014.

The data storage medium 1006 stores primarily a software program, image data for expressing displayed objects, sound data, play data and so on. Further, the data storage medium 1006 corresponds to the data storage medium 400 shown in FIG. 6. According to a consumer game machine, for example, a CD-ROM, a game cartridge, a DVD, or other medium is typically used as the data storage medium for storing the game program and other data, and a memory card or other medium is used as the data storage medium for storing the playing data. According to an arcade game machine, a semiconductor memory device such as a ROM or other medium or a hard disk is used as the data storage medium. In the above-described case the data storage medium 1006 can be achieved in the ROM 1002.

The control device 1022 is equivalent to the game controller, the operating panel, or other such device. Further, the control device 1022 is one used by the player to input the results of the decisions received while playing the game to the apparatus body.

The CPU 1000 controls the overall of the game apparatus and processes various data according to the game program stored to the data storage medium 1006, the system program (including initialization data for the game apparatus, and so on) stored to the ROM 1002, signals inputted by the control device 1022, or the like.

The RAM 1004 is a storage means used as an operating memory by the CPU 1000. Further, the RAM 1004 stores the particular contents of the data storage medium 1006 or the ROM 1002, operating results from the CPU 1000, and so on.

The sound generation IC 1008 and the image generation IC 1010 are also disposed in this type of game apparatus to generate and output sounds and images appropriate to the game.

The sound generation IC 1008 is an integrated circuit for generating game sounds such as sound effects, background music and so on, on the basis of the data stored to the data storage medium 1006 or the ROM 1002. The game sounds generated by the sound generation IC 1008 are outputted from the speaker 1020.

The image generation IC 1010 is an integrated circuit for generating pixel data to be outputted to the display device 1018, on the basis of the image data received from the RAM 1004, the ROM 1002, the data storage medium 1006, or the like.

The display device 1018 means a display device such as a CRT, a LCD, a TV, a plasma display, a projector or the like.

The communication device 1024 is for communicating various data used by the game apparatus with an external device. If the game apparatus is connected with another game apparatus, the communication device 1024 is used for communicating game programs, predetermined data corresponding to game programs, or other data with another game apparatus, through a communications line.

Various types of processing such as a processing of executing the game, a blurring processing and so on are achieved by the data storage medium 1006 which stores the game program 410, the α-value determining program 430 and the object data 450, and the CPU 1000, the image generation IC 1010, the sound generation IC 1008 and so on which operates according to the program.

It should be noted that the processes accomplished by the image generation IC 1010, the sound generation IC 1008, or the like, can be written as software applications run by the CPU 1000, a general purpose DSP, or other such device.

The α-value determining data 456 including the blurring function will be explained as it is one of the object data 450, according to the embodiment of the present invention. However, the following method of implementing the present invention will be effective.

That is, the method of assigning each blurring object to a predetermined storage space is generally as the method of implementing the object data 450.

Further, the blurring function is closely connected with the blurring object. Therefore, the method of storing the blurring function in a predetermined storage space, as one of data stored in the predetermined storage space to which each blurring object is assigned, for example, as one of texture data, is effectively.

Figure 11A:
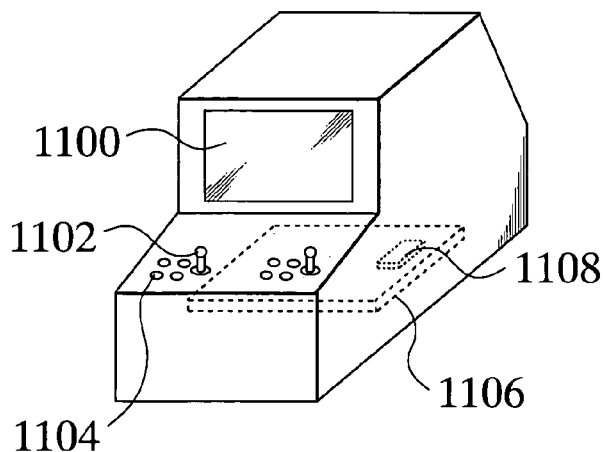
FIGS. 11A to 11C are views showing examples of various embodiments of the game apparatus of the present invention.

FIG. 11A shows an exemplary case wherein the game apparatus of the present invention is applied to an arcade game machine.

The player operates a lever 1102, buttons 1104 or the like, as watching the game image displayed on the display 1100, to enjoy the game. According to the arcade game machine, various types of processors, memories and so on are mounted on a system board 1106 that is a circuit board contained in the arcade game machine. The data including programs, for executing each members of the present invention is stored in a memory 1108 that is a data storage medium mounted on the system board 1106. Hereinafter, the data will be referred to as a storage data, as follows.

Figure 11B:
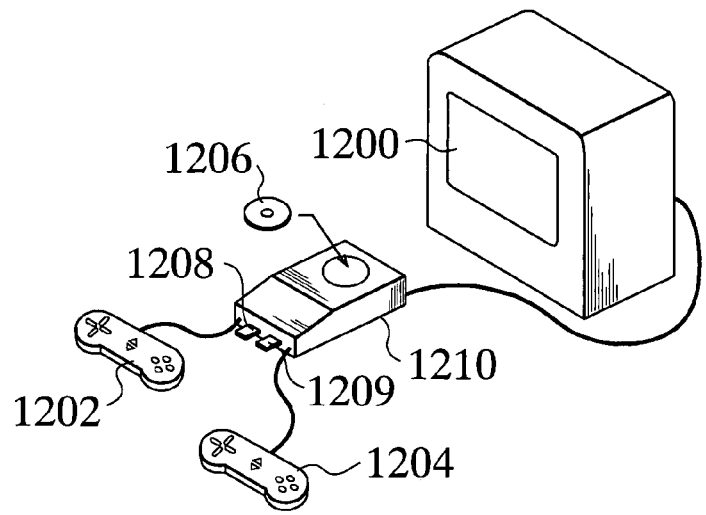

FIG. 11B shows an exemplary case wherein the game apparatus of the present invention is applied to a consumer game machine.

The player operates a lever 1202 or 1204, as watching the game image displayed on the display 1200, to enjoy the game. According to the consumer game machine, the above-described storage data is stored in a CD or DVD 1206, a memory card 1208 or 1209, or the like, as the data storage medium detachable from and attachable to an apparatus body 1210.

Figure 11C:
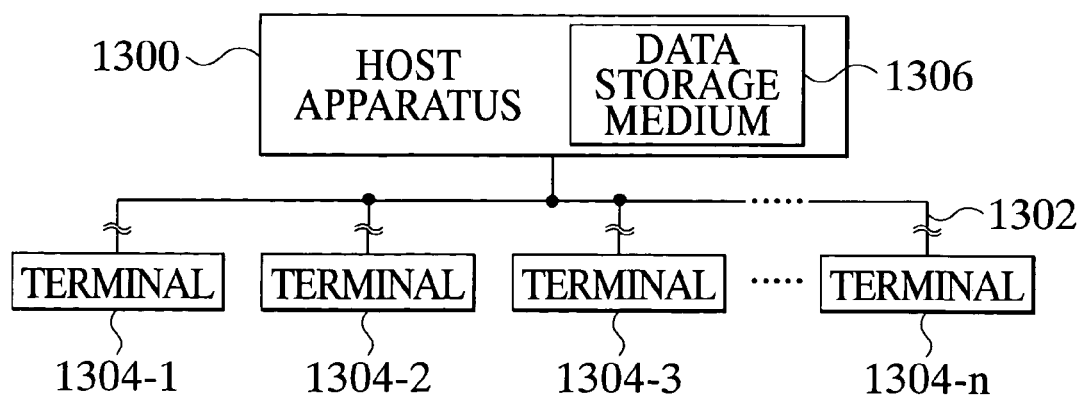

FIG. 11C shows an exemplary case wherein the game apparatus of the present invention is applied to a game system comprising a host apparatus 1300 and terminals 1304-1 to 1304-*n* connected to the host apparatus 1300 through a network 1302. The network 1302 includes a small area network system such as a LAN and a wide area network system such as an Internet.

According to the game system, the above-described storage data is stored to a data storage medium 1306 under control of the host apparatus 1300, such as a magnetic disk device, a magnetic tape device, a memory, or the like.

In the case each of the terminals 1304-1 to 1304-*n* can generate game images and game sounds with standing alone, the host apparatus 1300 sends the game program and so on for generating the game images and the game sounds, to each of the terminals 1304-1 to 1304-*n*. On the other hand, in the case each of the terminals 1304-1 to 1304-*n* cannot generate game images and game sounds with standing alone, the host apparatus 1300 generates game images and game sounds, to send them to each of terminals 1304-1 to 1304-*n*. Therefore, each terminal outputs the game images and the game sounds.

According to the game system having the construction as shown in FIG. 1C, each means of the present invention may be distributed between the host apparatus 1300 and each of terminals 1304-1 to 1304-*n*, that is, between the server and the client.

Further, the storage data for executing each means of the present invention may be distributed between the data storage medium of the host apparatus and the data storage medium of each terminal, that is, between the data storage medium of the server and the data storage medium of the client.

Further, according to the game system having the construction as shown in FIG. 1C, one or each of terminals 1304-1 to 1304-*n* connected to the network 1302 may be the consumer game machine as shown in FIG. 11B or the arcade game machine as shown in FIG. 11A.

Further, the arcade game machine and the consumer game machine may be composed so as to use a portable data storage device such as a memory card or a portable game machine, for transferring data from and to both the arcade game machine and the consumer game machine.

Although the present invention has been explained according to the above-described embodiment, it should also be understood that the present invention is not limited to the embodiment and various changes and modifications may be made to the invention without departing from the gist thereof.

For example, the game apparatus of the present invention may carry out the blurring processing as a depth of field processing. One example will be explained in FIGS. 12A and 12B.

Figure 12A:
FIGS. 12A and 12B are views showing exemplary practical screens of the game before and after the game apparatus performs the blurring processing to a billboard object, respectively.
Figure 12B:

FIGS. 12A and 12B are exemplary practical screens of the game before and after the game apparatus of the present invention performs the blurring processing to the billboard object, respectively.

In FIG. 12B, the billboard object consists of: a billboard as the blurring object thereof; and an object forming the same shape as the billboard and patterned like the color saturation of the billboard is toned down as the foundation object thereof.

As shown in FIG. 12A, the whole billboard is clearly displayed on the screen before the game apparatus carries out the blurring processing to the billboard object, regardless of the distance from this side of the screen that is the virtual camera location to each part of the billboard. However, in the real world, one point is in focus. As a result, in the case the part of the billboard near to the virtual camera location is in focus, the part of the billboard far away from the virtual camera location is looked blurring.

However, as shown in FIG. 12B, the game apparatus of the present invention carries out the blurring processing to the billboard object, and thereby it is possible that the part of the billboard far away from the virtual camera location is blurred and expressed. Consequently, it is possible that the game apparatus generate the realistic game image.

Further, in the above-described case, the game apparatus may carry out the blurring processing to the billboard object not only on the basis of the location of the virtual camera but also according to the distance from the fixation point set in the object space to each part of the billboard. Therefore, it is possible that the fixation point is set at the predetermined position to which the player is attracted his attention, in the object space.

Furthermore, in the above-described case, it has been explained that the game apparatus carries out the blurring processing only on the basis of the distance from the virtual camera. However, the game apparatus may carry out the blurring processing according to the sight line angle such as a depression angle or an elevation angle to the object viewed from the virtual camera.

Furthermore, it has been explained that the game apparatus carries out the blurring processing to the motorcycle racing game as an example, according to the above-described embodiment. However, it is not to say that the game apparatus may carry out the blurring processing to another game such as a sports game like a football or a basket ball, a role playing game, a shooting game, and so on. For example, in the case the game apparatus carries out the blurring processing to the football game, it is possible that the game apparatus carries out the blurring processing to white lines or grasses of a football field.

Furthermore, the game apparatus may carry out the blurring processing not only independently but also in combination with a mip mapping, a LOD (Level Of Detail) processing, or a anti-aliasing.

Furthermore, although it has been explained that the predetermined object comprises one blurring object according to the above-described embodiment, the predetermined object may comprise a plurality of blurring objects.

Figure 13:
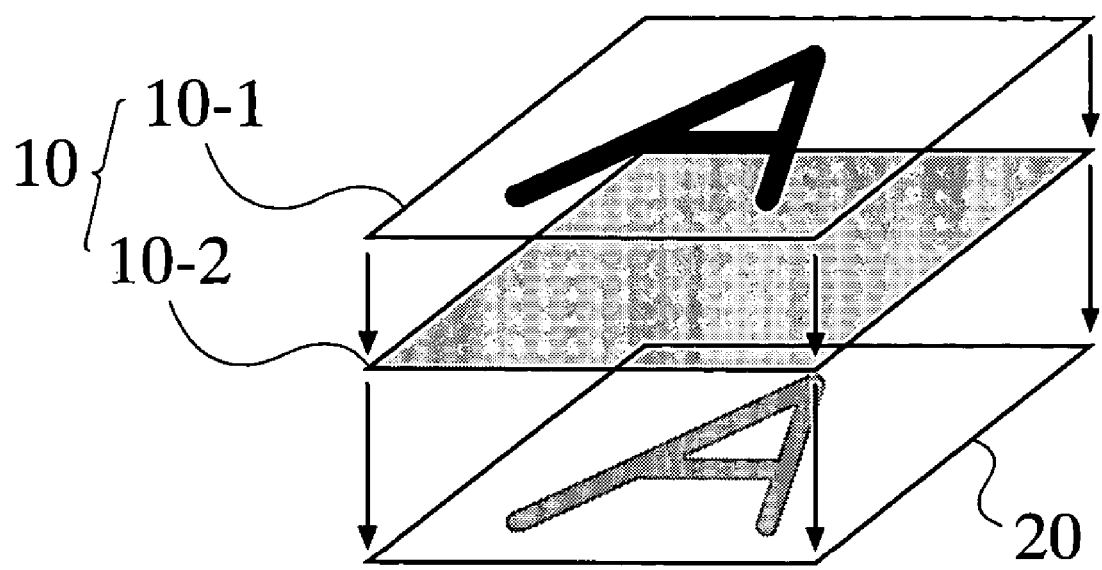
FIG. 13 is a view showing an example of an object comprising a plurality of blurring objects and a foundation object.

That is, as shown in FIG. 13, the blurring object may comprise an object 10-1 and an object 10-2. In the above-described case, the game apparatus may carry out the blurring processing not only to the object 10-1, but also to the objects 10-1 and 10-2 at the same time. Further, the blurring function may be set every object composing the blurring object 10.

A main effect according to the embodiment of the present invention will be indicated, as follows.

According to the present invention, it is possible that strange images caused by the restriction of the resolution or the refresh rate of the display section, are easily reduced effectively. That is, because the blurring processing can be carried out only to the predetermined object of objects in the object space, the amount of operation of the blurring processing can be smaller than one of blurring processing carried out to all objects according to the distance. As a result, it is possible to realize the blurring processing carried out at a high speed.

Further, because the object to be blurred by the blurring processing comprises the blurring object and the foundation object, it is possible that the natural game image is generated even if the image of the blurring object is blurred.

The entire disclosure of Japanese Patent Application No. Tokugan 2000-136370 filed on May 9, 2000 including specification, claims, drawings and summary are incorporated herein by reference in its entirety.

What is claimed is:

1. A game apparatus comprising:
   an image generation section for generating a space image of an object space, viewed from a virtual camera;
   a blurring section for blurring an object first image of a predetermined object of objects in the object space, according to a distance from a predetermined position to the predetermined object in the object space, to generate a blurred object second image, wherein the predetermined object comprises an objective target having at least one target surface that expresses a target of the predetermined object, and an objective foundation that expresses a foundation of the target according to a background of the predetermined object, and wherein the blurring section blurs an image of the objective target such that an image of the objective foundation is brought into view; and
   an execution section for executing a predetermined game by displaying the space image including the blurred object second image on a display section.

2. A game apparatus as claimed in claim 1,
   wherein the predetermined object the object first image of which is blurred by the blurring section is determined from the objects in the object space, according to a progress of the predetermined game executed by the execution section.

3. A game apparatus as claimed in claim 1,
   wherein the predetermined position is a location of the virtual camera.

4. A game apparatus as claimed in claim 3,
   wherein the blurring section blurs the object first image of the predetermined object, according to a sight line angle of the virtual camera to the predetermined object.

5. A game apparatus as claimed in claim 1, further comprising:
   a setting section for setting a fixation point that is a position on which a game player is to focus in the object space, according to a progress of the predetermined game executed by the execution section; and
   a section for taking the fixation point set by the setting section as the predetermined position.

6. A game apparatus as claimed in claim 1,
   wherein the predetermined game is a racing game, and the blurring section blurs an object image on a racing course of the racing game.

7. A game apparatus as claimed in claim 1,
   wherein the blurring section blurs an object image of an object processed by an anti-aliasing, a mip mapping or a level of detail processing, of the objects in the object space.

8. A game apparatus as claimed in claim 1,
   wherein the blurring section carries out an image composition processing to the predetermined object as a transparency of the predetermined object is changed.

9. A game apparatus comprising:
an image generation section for generating a space image of an object space, viewed from a virtual camera;
a blurring section for blurring an object first image of a predetermined object of objects in the object space, according to a distance from a predetermined position to the predetermined object in the object space, to generate a blurred object second image; and
an execution section for executing a predetermined game by displaying the space image including the blurred object second image on a display section;
wherein the predetermined object comprises a first object that expresses a foundation and a second object that expresses a surface layer having at least one surface on the first object; and
the blurring section blurs the second object that the first object is brought into view.

10. A storage medium having a computer-executable program recorded thereon, wherein the program comprises:
instructions for generating a space image of an object space, viewed from a virtual camera;
instructions for blurring an object first image of a predetermined object of objects in the object space, according to a distance from a predetermined position to the predetermined object in the object space, to generate a blurred object second image;
instructions for expressing a target of the predetermined object;
instructions for expressing a foundation of the target, according to a background of the predetermined object;
instructions for expressing the predetermined object having the target and the foundation;
instructions for blurring an image of the target and bringing an image of the foundation into view; and
instructions for of executing a predetermined game by displaying the space image including the blurred object second image on a display section.

11. A storage medium having a computer-executable program recorded thereon, as claimed in claim 10, wherein the program further comprises:
instructions for determining the predetermined object the object first image of which is blurred from the objects in the object space, according to a progress of the predetermined game.

12. A storage medium having a computer-executable program recorded thereon, as claimed in claim 10, wherein the program further comprises:
instructions for setting a location of the virtual camera as the predetermined position.

13. A storage medium having a computer-executable program recorded thereon, as claimed in claim 12, wherein the program further comprises:
instructions for blurring the object first image of the predetermined object, according to a sight line angle of the virtual camera to the predetermined object.

14. A storage medium having a computer-executable program recorded thereon, as claimed in claim 10, wherein the program further comprises:
instructions for setting a fixation point that is a position on which a game player is to focus in the object space, according to a progress of the predetermined game; and
instructions for taking the set fixation point as the predetermined position.

15. A storage medium having a computer-executable program recorded thereon, as claimed in claim 10, wherein the program further comprises:
instructions for blurring an object image on a racing course of a racing game as the predetermined game.

16. A storage medium having a computer-executable program recorded thereon, as claimed in claim 10, wherein the program further comprises:
instructions for blurring an object image of an object processed by an anti-aliasing, a mip mapping or a level of detail processing, of the objects in the object space.

17. A storage medium having a computer-executable program recorded thereon, as claimed in claim 10, wherein the program further comprises:
instructions for carrying out an image composition processing to the predetermined object as a transparency of the predetermined object is changed.

18. A storage medium having a computer-executable program recorded thereon, wherein the program further comprises:
instructions for generating a space image of an object space, viewed from a virtual camera;
instructions for blurring an object first image of a predetermined object of objects in the object space, according to a distance from a predetermined position to the predetermined object in the object space, to generate a blurred object second image;
instructions for expressing a foundation of the predetermined object;
instructions for expressing a surface layer having at least one surface on the foundation, of the predetermined object;
instructions for expressing the predetermined object having the foundation and the surface layer;
instructions for blurring the surface layer and bringing the foundation into view; and
instructions for executing a predetermined game by displaying the space image including the blurred object second image on a display section.

19. A computer program stored on a computer-readable storage medium, the computer program comprising instructions for performing the steps of:
generating a space image of an object space, viewed from a virtual camera;
blurring an object first image of a predetermined object of objects in the object space, according to a distance from a predetermined position to the predetermined object in the object space, to generate a blurred object second image;
expressing a target of the predetermined object;
expressing a foundation of the target, according to a background of the predetermined object;
expressing the predetermined object having the target and the foundation;
blurring an image of the target and bringing an image of the foundation into view; and
executing a predetermined game by displaying the space image including the blurred object second image on a display section.

20. A computer program as claimed in claim 19, further comprising instructions for performing the step of: determining the predetermined object the object first image of which is blurred from the objects in the object space, according to a progress of the predetermined game.

21. A computer program as claimed in claim 19, further comprising instructions for performing the step of: setting a location of the virtual camera as the predetermined position.

22. A computer program as claimed in claim 21, further comprising instructions for performing the step of: blurring the object first image of the predetermined object, according to a sight line angle of the virtual camera to the predetermined object.

23. A computer program as claimed in claim 19, further comprising instructions for performing the step of: setting a fixation point that is a position on which a game player is to focus in the object space, according to a progress of the predetermined game: and taking the set fixation point as the predetermined position.

24. A computer program as claimed in claim 19, further comprising instructions for performing the step of: blurring an object image of a racing course on a racing game as the predetermined game.

25. A computer program as claimed in claim 19, further comprising instructions for performing the step of: blurring an object image of an object processed by an anti-aliasing, a mip mapping or a level of detail processing, of the objects in the object space.

26. A computer program as claimed in claim 19, further comprising instructions for performing the step of: carrying out an image composition processing to the predetermined object as a transparency of the predetermined object is changed.

27. A computer program stored on a computer-readable storage medium, the computer program comprising instructions for performing the steps of:

generating a space image of an object space, viewed from a virtual camera;

blurring an object first image of a predetermined object of objects in the object space, according to a distance from a predetermined position to the predetermined object in the object space, to generate a blurred object second image;

expressing a foundation of the predetermined object;

expressing a surface layer having at least one surface on the foundation, of the predetermined object;

expressing the predetermined object having the foundation and the surface layer;

blurring the surface layer and bringing the foundation into view; and executing a predetermined game by displaying the space image including the blurred object second image on a display section.

* * * * *